May 17, 1932.  C. C. HANSEN  1,858,992
HOSE COUPLING
Filed April 9, 1930

INVENTOR.
Charles C. Hansen
BY
HIS ATTORNEY

Patented May 17, 1932

1,858,992

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

HOSE COUPLING

Application filed April 9, 1930. Serial No. 442,840.

This invention relates to couplings, but more particularly to a coupling for connecting a hose terminal or similar member to the end of a pipe line.

One object of the invention is to prevent the members comprising the coupling from becoming accidentally separated or unthreaded.

Other objects will be in part obvious and in part pointed out hereinafter.

Figure 1:
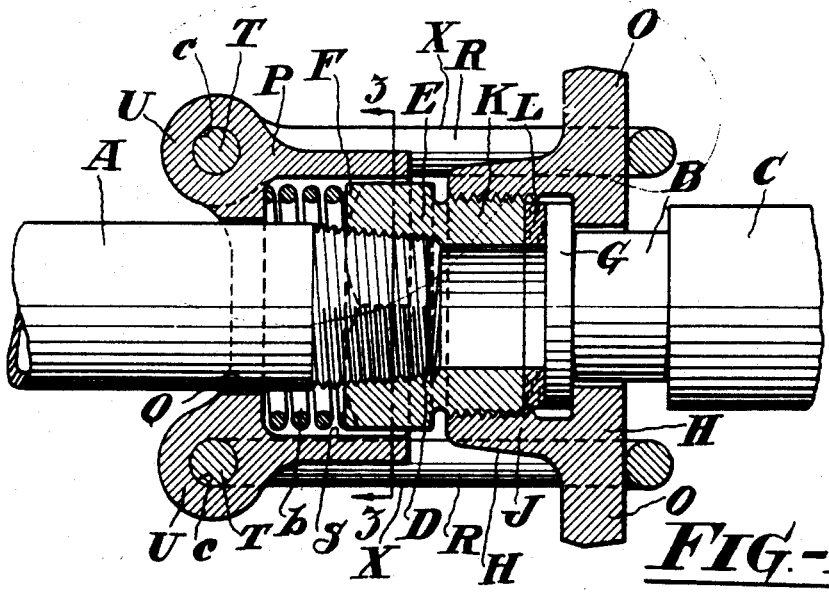
Figure 2:
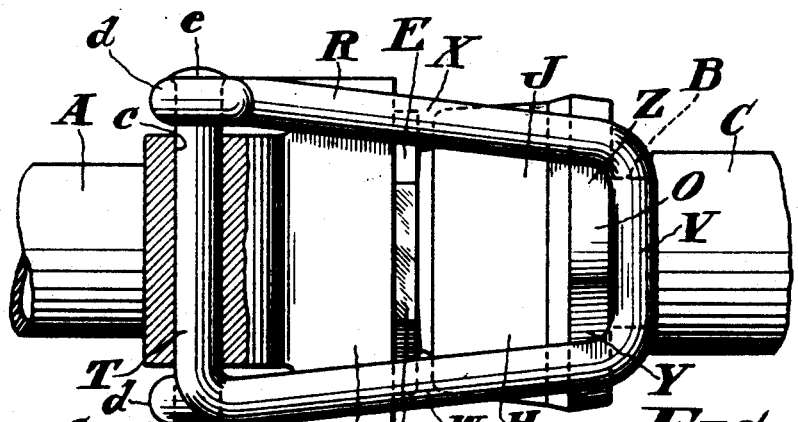
Figure 3:
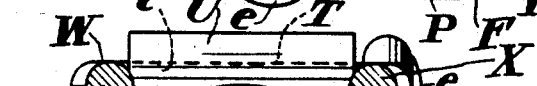

In the accompanying drawings forming part of the specification and in which similar reference characters refer to similar parts, Figure 1 is a longitudinal sectional elevation of a coupling constructed in accordance with the practice of the invention, Figure 2 is a plan view of the coupling partly broken away, and Figure 3 is a transverse view taken through Figure 1 on the line 3—3 looking in the direction indicated by the arrows.

Referring to the drawings, A and B designate pipe sections which it is desired to connect in endwise relation. The pipe section B may be in the form of a terminal of a flexible conduit and accordingly is shown inserted into the end of a hose C to which it may be secured in any well known manner.

The pipe section A preferably has a tapered threaded end portion D on which may be screwed an interiorly threaded bushing member E. In this instance the bushing E is provided with a wrench receiving head F, preferably of polygonal shape, whereby the bushing E may be tightly threaded on the pipe end D.

The terminal B is shown provided with the usual end flange G which serves as an abutment for a union sleeve H disposed on the terminal B inwardly of the flange G. The union sleeve H may comprise the female portion of the coupling and accordingly has a concentrically disposed interiorly threaded boss J at its outer end which is adapted to encircle the flange G and extend forwardly thereof to receive an exteriorly threaded extension K of the bushing E. Any suitable packing material L may be interposed between the flange G and the extension K to prevent leakage between the cooperating end faces of the flange and the extension.

Preferably the corresponding threaded portions of the boss J and the extension K are of cylindrical conformation and the threads may be of uniform depth to facilitate the screwing and unscrewing of the union sleeve H on the bushing E. In this instance the union sleeve H is further provided with radially spaced peripheral lugs O to afford convenient gripping surfaces for manual rotation of the union sleeve.

As is well known to persons skilled in the art, flexible conduits connected to a machine having a vibratory trembling or a severe jarring movement have a tendency to become loosened at the connections. Hence, there is the risk of pressure fluid leakage and the risk of accident incident to the whipping motion of the conduit upon complete severance of the connection.

To the end that unscrewing of the union sleeve H from the bushing E may be prevented means are provided to interlock the union sleeve H with the bushing E for preventing relative movement between these members. The locking mechanism preferably comprises a body portion P having a central aperture Q to receive the pipe section A inwardly from the wrench receiving head F of the bushing E and a plurality of yokes R journaled in the body portion P and adapted to engage the lugs O of the union sleeve H. A recess S formed in the body portion P is preferably of polygonal conformation to receive the head F which it may engage for preventing relative rotation of the body portion P and the bushing E.

The yokes R may be identical in all essential respects and each yoke may be in the form of a loop and has a straight portion T journaled in one of several laterally extending lugs U on the body portion P in such manner that the yoke may be swung in the plane of the longitudinal axis of the body portion P. At the opposite ends of the yokes R from the portions T are straight portions V which are adapted to seat upon the lugs O and are connected to the portions T by side arms W and X which are so spaced at the juncture with the portions V as to engage the opposite side faces Y and Z of the lugs O. A spring $b$ disposed in the recess S acts to hold the yokes R in firm engagement with the lugs O.

The straight portions T of each yoke R may comprise the straight end portions of a wire which may be inserted into bores $c$ of the lugs V, and the portions W, V and X may be formed by consecutively bending the wire at the desired points. The ends of the wires which form the terminals of the portions X may be returned bent to form hooks $d$ adapted to encircle the portions T inwardly of upset ends $e$ on the portions T. Sufficient tension may be imparted to the yokes R to assure the firm engagement of the hooks $d$ with the upset ends $e$.

In the assembling of the device, the locking mechanism, together with the spring $b$, may first be disposed on the pipe section A after which, with the aid of a wrench, the bushing E may be tightly threaded on the threaded portion D of the pipe section. The hose terminal B equipped with the union sleeve H may then be brought into endwise relation with the pipe section A for threading the union sleeve on the bushing. By gripping the free ends of the yokes R the body portion P of the locking mechanism may be rotated to the position in which the walls of the socket S are in alignment with the peripheral surfaces of the head F of the bushing E whereupon the locking mechanism may be moved longitudinally of the coupling to permit swinging the free ends of the yokes into engagement with the lugs O of the union sleeve.

In operation the spring $b$ maintains the yokes R in engagement with the lugs O despite the vibration of the hose C, and manual pressure is required to swing the yokes outwardly to permit unscrewing of the coupling members.

I claim:

1. A coupling comprising a pair of threadedly connected members, a spring seated with one end against one member, means arranged coaxially with the members and serving as a seat for the other end of the spring, said means being slidably interlocked with one member, and means on the first said means engaging the other member for preventing unscrewing of the members.

2. A coupling comprising a pair of threadedly connected members, one of said members having a head, a hollow body slidably disposed on said member, a spring interposed between the hollow body and the head, and means pivoted on the hollow body and adapted to engage the other member to prevent unscrewing of the members.

3. A coupling comprising a pair of threadedly connected members, one of said members having a head, a hollow body slidably disposed on said member, a spring interposed between the hollow body and the head, a laterally extending lug on the other member, and a yoke pivoted on the hollow body and adapted to engage the lug for preventing unscrewing of the members.

4. A coupling comprising a pair of threadedly connected members, one of said members being provided with a head, a hollow body slidably disposed on said member, means on the hollow body to prevent relative rotation of the hollow body and said member, a spring interposed between the hollow body and the head, a laterally extending lug on the other member, and a yoke pivoted on the hollow member and adapted to engage the lug for preventing unscrewing of the members.

5. A coupling comprising a pair of threadedly connected members, one of said members being provided with an angularly shaped head, a hollow body slidably disposed on said member and having a recess to receive the head for preventing relative rotation of the hollow body and the head, a spring disposed in said recess to act against the head, a laterally extending lug on the other member, and a yoke pivoted on the hollow body and adapted to engage the lug for preventing unscrewing of the members.

6. A coupling comprising a pair of threadedly connected members, one of said members being provided with an angularly shaped head, a hollow body slidably disposed on said member and having a recess to receive the head for preventing relative rotation of the hollow body and the head, a spring disposed in the recess to act against the head, a laterally extending lug on the other member, a transverse bore in the hollow member, a yoke journaled in said bore and adapted to engage the lug to prevent unscrewing of the members, said yoke comprising a single length of wire bent to form a loop, and means for interlocking the ends of the yoke.

In testimony whereof I have signed this specification.

CHARLES C. HANSEN.